(12) United States Patent
Liu

(10) Patent No.: US 6,546,450 B1
(45) Date of Patent: Apr. 8, 2003

(54) METHOD AND APPARATUS FOR SHARING A UNIVERSAL SERIAL BUS DEVICE AMONG MULTIPLE COMPUTERS BY SWITCHING

(75) Inventor: Andrew S. Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,659

(22) Filed: Dec. 22, 1999

(51) Int. Cl.$^7$ .......................... G06F 13/00; G06F 13/38
(52) U.S. Cl. ...................... 710/316; 710/305; 710/62; 710/100
(58) Field of Search ................ 710/62, 63, 64, 710/100, 305, 316

(56) References Cited

U.S. PATENT DOCUMENTS

| | | | | |
|---|---|---|---|---|
| 5,748,189 A | * | 5/1998 | Trueblood | 345/331 |
| 6,389,560 B1 | * | 5/2000 | Chew | 714/43 |
| 6,138,191 A | * | 10/2000 | Fujii et al. | 710/73 |
| 6,141,719 A | * | 10/2000 | Rafferty et al. | 710/316 |
| 6,199,137 B1 | * | 3/2001 | Aguilar et al. | 710/305 |
| 6,275,857 B1 | * | 8/2001 | McCartney | 709/226 |

FOREIGN PATENT DOCUMENTS

| | | | |
|---|---|---|---|
| JP | 409185483 A | * | 7/1997 |
| JP | 410083369 A | * | 3/1998 |
| JP | 411265253 A | * | 9/1999 |

OTHER PUBLICATIONS

Kosar A. Jaff, Universal Serial Bus and the Multimedia PC, 1996, pp. 9 Intel Corporation.

* cited by examiner

Primary Examiner—Xuan M. Thai
(74) Attorney, Agent, or Firm—Blakely, Sokoloff, Taylor & Zafman LLP

(57) ABSTRACT

A method and apparatus for allowing multiple electronic systems to share a Universal Serial Bus (USB) device is disclosed.

In one embodiment, the electronic systems and the USB device are connected to a switcher. The switcher performs bus enumeration to acquire USB device information and presents a number of images of the acquired USB device information to the electronic systems. The switcher also maintains logical links between the connected electronic systems and the USB device. Lastly, the switcher selects one of the connected electronic systems to communicate USB data packets with the USB device.

29 Claims, 6 Drawing Sheets

METHOD AND APPARATUS FOR SHARING A UNIVERSAL SERIAL BUS DEVICE AMONG MULTIPLE COMPUTERS BY SWITCHING

FIELD OF THE INVENTION

This invention relates to switching technologies generally and particularly related to Universal Serial Bus technology.

BACKGROUND OF THE INVENTION

Universal Serial Bus (hereinafter USB) technology is a communication protocol in accordance with the Universal Serial Bus Specification, Revision 1.1, Sep.b 23, 1998, that supports serial data transfers between a USB host computer and USB-capable peripheral. The host serves as the master of the bus, and the peripherals perform as slaves connected either directly to the host or through hubs. USB transfers signal and power over a four-wire cable, or cable 100 as shown in FIG. 1.

One of the major benefits of USB is its support for "hot" attachment and detachment of devices. Specifically, users can plug in and use a new USB device without having to shut off the host system. Immediately after a device is attached to the USB host, the host controller is alerted of the attachment (s) by voltage changes on the $D^+$ (104) and $D^-$ (106) lines. Then the host goes through a bus enumeration process to acquire information from the connected device, gives it a unique address and assigns it a configuration value. On the other hand, when the device is detached from the host, specific voltage changes on the $D^+$ (104) and $D^-$ (106) lines alert the host of the action. In response to the notification, the host acknowledges the removal of the device and frees up any host resources previously committed to the device.

Although multiple USB devices can connect to either a USB hub or a USB host, other situations demand multiple USB hosts to share a USB device. For example, a company presenting its software product in a tradeshow may have multiple computers running the software. In order to control these computers and operate the software, the company may have a USB input/output (hereinafter I/O) device, such as a USB keyboard and/or a USB mouse, attached to each one of the computers. This one I/O device per computer type of arrangement not only is costly, but also unnecessarily clutters the already limited presentation area. Moreover, the arrangement may lead to undesirable human errors, especially when the number of computers is unmanageably large. For instance, users may use an incorrect USB I/O device to try to access a particular computer.

Therefore, a method and apparatus is needed to allow multiple electronic systems a to share a USB device.

SUMMARY OF THE INVENTION

A method and apparatus for allowing multiple electronic systems to share a Universal Serial Bus (USB) device is disclosed.

In one embodiment, the electronic systems and the USB device are connected to a switcher. The switcher performs bus enumeration to acquire USB device information and presents a number of images of the acquired USB device information to the electronic systems. The switcher also maintains logical links between the connected electronic systems and the USB device. Lastly, the switcher selects one of the connected electronic systems to communicate USB data packets with the USB device.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus for allowing multiple electronic systems to share a Universal Serial Bus (hereinafter USB) device is described. In the following description, numerous specific details are set forth, such as the number of upstream ports, the number of images of device information, etc., in order to provide a thorough understanding of the present invention. However, it will be apparent to one of ordinary skill in the art that the invention may be practiced without these particular details. In other instances, well-known elements and theories such a Serial Interface Engine (hereinafter SIE), USB host controller, USB data transfer categories, USB data packets, USB protocol, USB bus interface, USB power specifications, etc., have not been discussed in special details in order to avoid obscuring the present invention.

Additionally, throughout the disclosure, an "image" of device information refers to a duplicate copy of the device information. A "host-side USB bus interface" refers to the bus interface on a USB host, and a "device-side USB bus interface" refers to the bus interface on a USB device. Also, a USB "host" interacts with USB devices through a USB host controller. The host, through its host controller, is responsible for providing functionality such as: detecting the attachment and removal of USB devices; managing control flow between the host and the USB devices; managing data flow between the host and USB devices; collecting status and activity statistics and providing power to attached USB devices. On the other hand, USB devices generally include three components: a SIE, some hardware and firmware combination and capability of the device.

Figure 1:
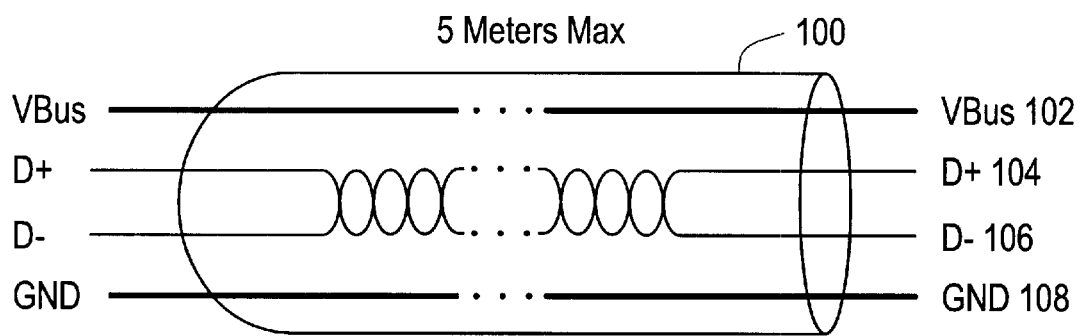
FIG. 1 illustrates a USB cable.
Figure 2:
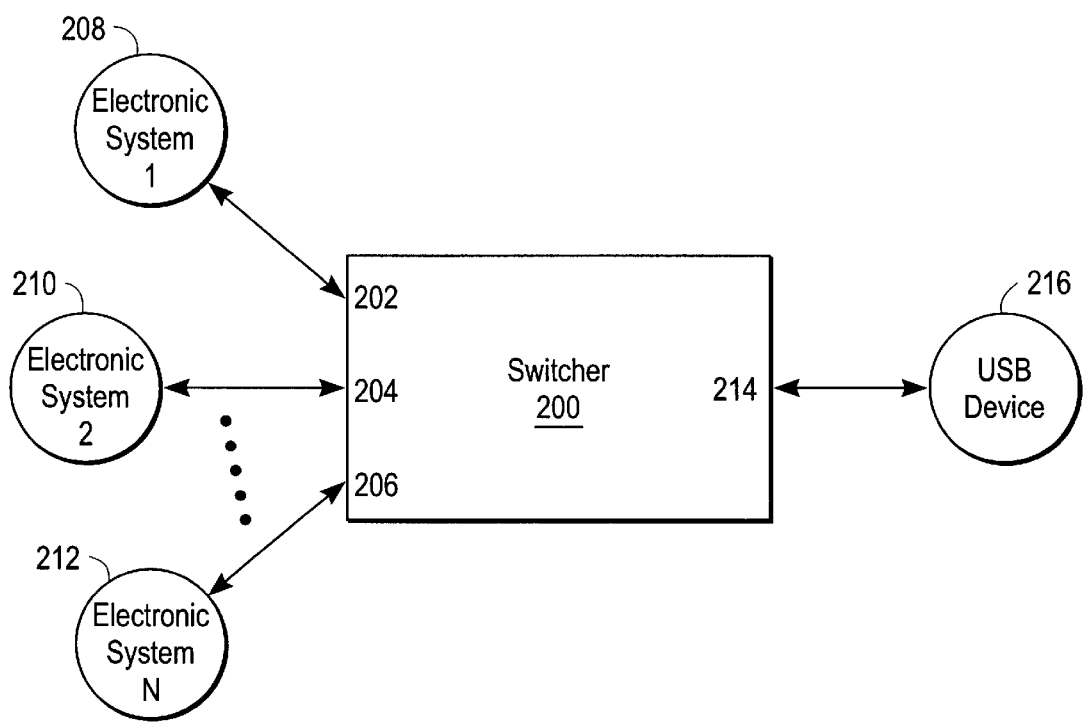
FIG. 2 illustrates a general block diagram of one configuration of multiple electronic systems connected to a USB device through a switcher.

FIG. 2 demonstrates a general block diagram of one configuration of multiple electronic systems connected to a USB device through a switcher. Specifically, switcher 200 connects to electronic systems 1 (208), 2 (210) and N (212) through upstream ports 202, 204 and 206, respectively. Switcher 200 also connects to USB device 216 through downstream port 214. Upstream port in this context refers to a connection from a device to a host, whereas downstream port refers to a connection from a host to a device. The communications through these ports are based on published USB protocols, and they transfer signal and power through cables such as cable 100 shown in FIG. 1. In addition, the electronic systems in FIG. 2 are USB hosts. Thus, they contain USB host controllers to provide the required host functionality as has been previously discussed.

Switcher 200 can either be self-powered or bus-powered. For a self-powered switcher 200, the switcher has a local power supply. In some instances, critical components of switcher 200 may be powered by its upstream electronic systems to avoid potential issues associated with defect or exhaustion of the local power supply. On the other hand, for a bus-powered switcher 200, the switcher relies on power from upstream electronic systems.

Figure 3:
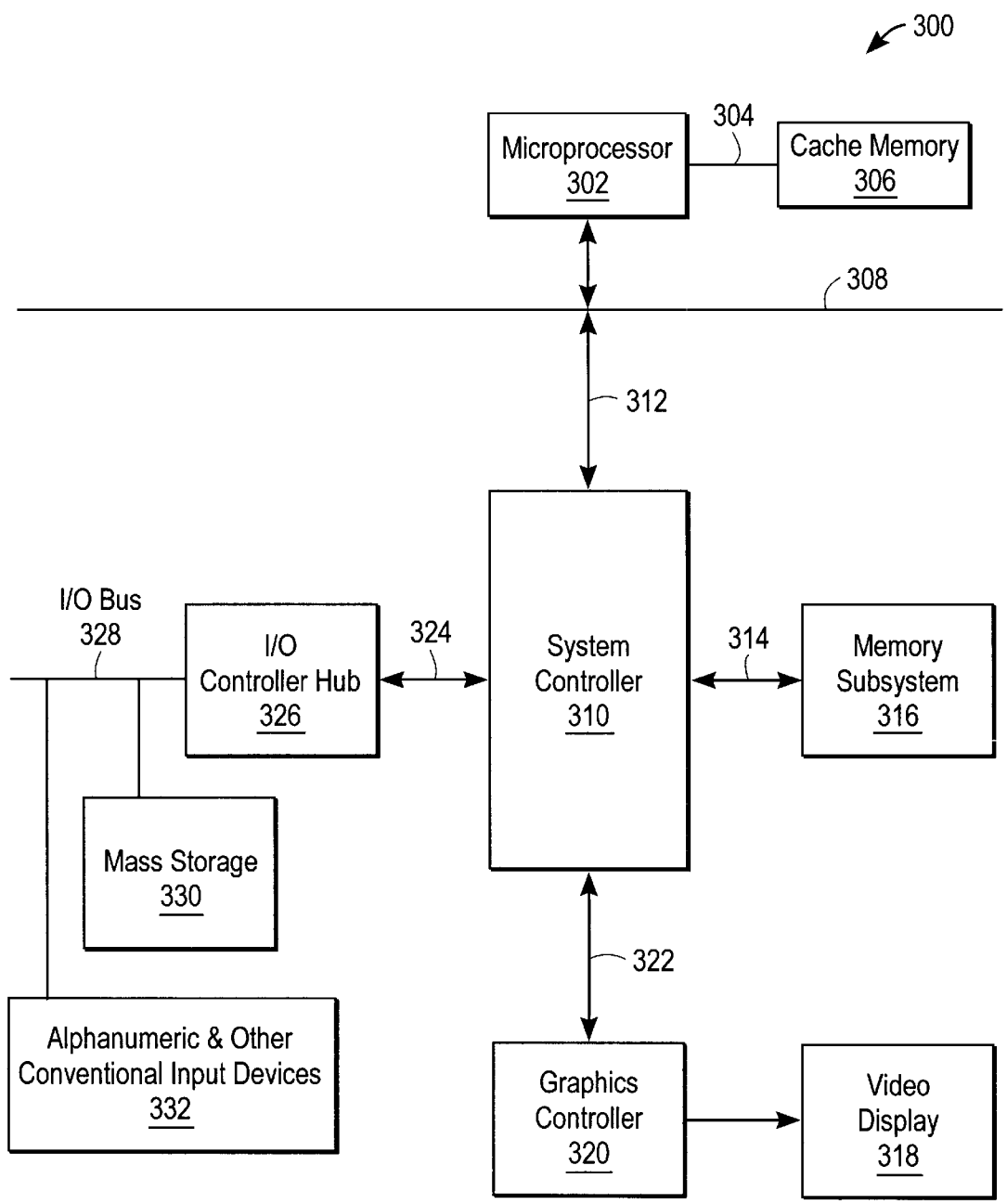
FIG. 3 illustrates a general-purpose computer system architecture.

Some examples of the electronic system are, but not limited to, standalone electronic apparatuses and general-purpose computer systems. A general-purpose computer system 300 is illustrated in FIG. 3. The general-purpose computer system architecture comprises microprocessor 302 and cache memory 306 coupled to each other through processor bus 304. Sample computer system 300 also includes high performance system bus 308 and standard bus 328. Coupled to high performance system bus 308 are microprocessor 302 and system controller 310. Additionally, system controller 310 is coupled to memory subsystem 316 through channel 314, is coupled to I/O controller hub 326 through link 324 and is coupled to graphics controller 320 through interface 322. Coupled to graphics controller is video display 318. Coupled to standard I/O bus 328 are I/O controller hub 326, mass storage 330 and alphanumeric input device or other conventional input device 332.

These elements perform their conventional functions well known in the art. Moreover, it should have been apparent to one ordinarily skilled in the art that computer system 300 could be designed with multiple microprocessors 302 and may have additional components or more components than that which is shown. Also, in one embodiment of computer system 300, the mentioned USB host controller is part of I/O controller hub 326. However, it should be apparent to one ordinarily skilled in the art to design computer system 300 without such integration.

Detailed Operation of One Embodiment of a Switcher

Figure 4:
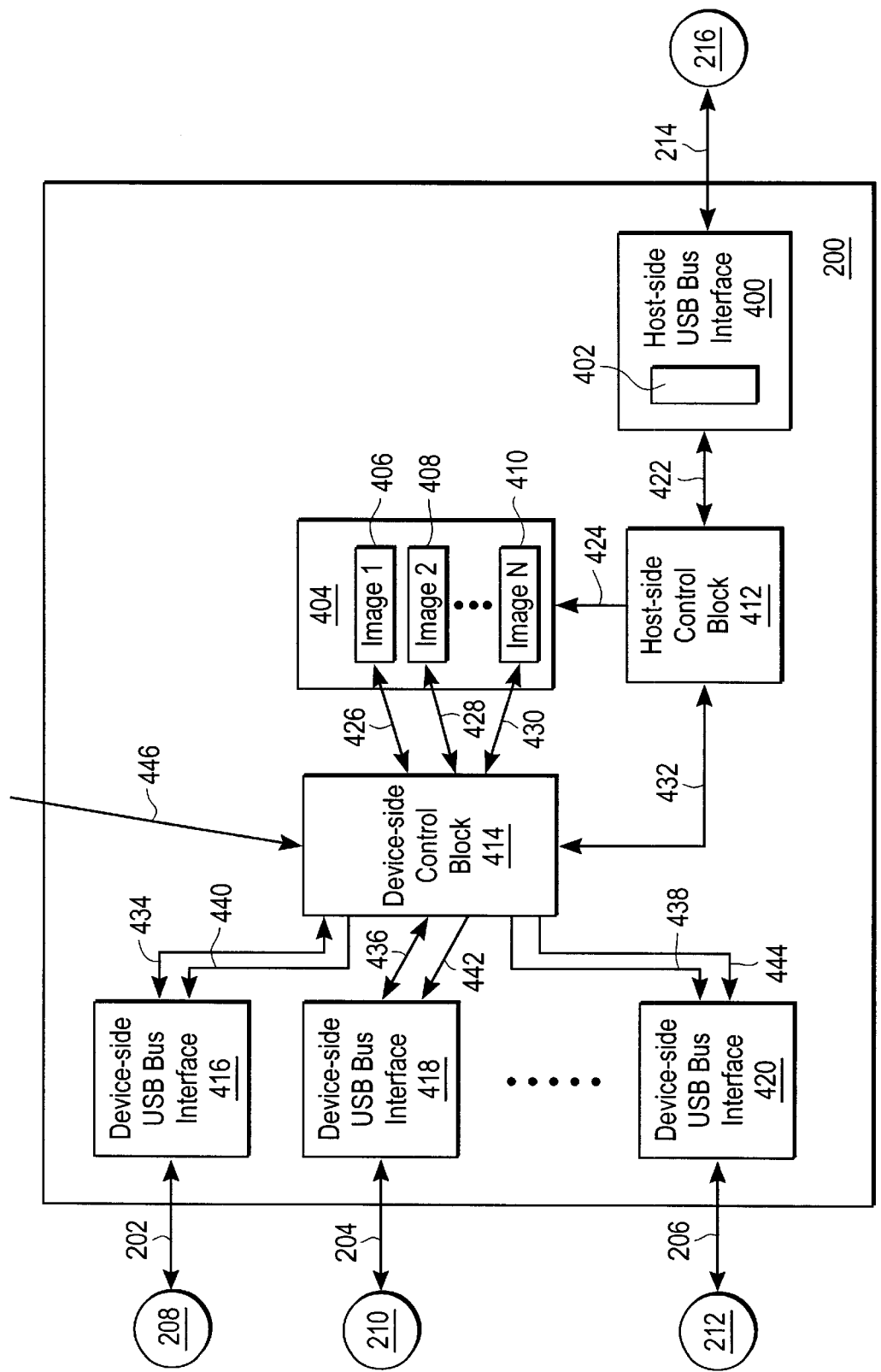
FIG. 4 illustrates a block diagram of one embodiment of a switcher.

FIG. 4 illustrates one embodiment of switcher 200. In this embodiment, switcher 200 has separate host-side USB bus interface 400 (hereinafter bus interface 400) and device-side USB bus interfaces 414, 416 and 418 (hereinafter bus interfaces 414, 416 and 418 respectively). These bus interfaces provide physical, signaling and packet connectivity between a USB host and a USB device. Host-side USB bus interface 400 further includes host controller 402. Switcher 200 also has memory subsystem 404 and a control block. For discussion purposes, the control block is split into host-side control block 412 and device-side control block 414. The two control blocks have access to each other's state information through channel 432. It should be apparent to one ordinarily skilled in the art to design switcher 200 with either one single control block or multiple control blocks.

Host-side control block 412 is connected to bus interface 400 through link 422 and is also connected to memory subsystem through link 424. Host-side control block 412 oversees the data communication between bus interface 400 and memory subsystem 404. Specifically, when USB device 216 is attached to switcher 200, host controller 402 of bus interface 400 initiates a bus enumeration process. During this process, host controller 402 requests information from USB device 216 and uses the information to determine the device's capabilities.

When bus interface 400 completes capturing the device information, host-side control block 412 relays the captured information to memory subsystem 404 through links 422 and 426. More particularly, host-side control block 412 causes memory subsystem 404 to store a number of the same images of the captured device information. In one implementation, the number of images is equal to the number of switcher 200's upstream ports. The number can either be predetermined or be dynamically established. FIG. 4 illustrates 3 images: images 1 (406), 2 (408) and N (410).

Images 1 (406), 2 (408) and N (410) further connect to device-side control block 414. When the images become available to device-side control block 414, device-side control block 414 powers on the upstream ports 202, 204 and 206 and their associated bus interfaces 416, 418 and 420 through control links 440, 442 and 444. When the bus interfaces are powered on, the voltage changes prompt the connected electronic systems 1 (208), 2 (210) and N (212) to initiate bus enumeration processes.

In one embodiment, device-side control block 414 may power on one selected bus interface according to some input control information. For example, when an operator of USB device 216, such as a USB keyboard, wishes to work with electronic system 1 (208), he or she may type in a predetermined sequence of keys that correspond to the upstream port which electronic system 1 (208) is attached to. As host-side control block 412 receives and recognizes this sequence through link 422, device-side control block 414 also learns of the sequence through channel 432. Device-side control block 414 proceeds to power on bus interface 416 and thus facilitates the bus enumeration process between electronic system 1 (208) and bus interface 416.

Alternatively, device-side control block 414 may also receive the input control information through input 446 from another external input source. For instance, switcher 200 may implement physical buttons on the outside of its housing, where each button corresponds to a specific upstream port and the electronic system attached to the port. Therefore, pressing one of the described buttons results in transmitting input control information to device-side control block 414 through input 446.

In another embodiment, device-side control block 414 may initially power on bus interfaces one at a time regardless of any input control information. In yet another embodiment, device-side control block 414 may power on all the bus interfaces at the same time, where each bus interface engages in its own bus enumeration process with its corresponding electronic system independently. Once device-side control block 414 powers on bus interfaces, device-side control block 414 is responsible for supplying proper voltage to the bus interfaces to maintain their attachments to the electronic systems, and thus maintains the logical connections between the electronic systems and USB device 216.

More specifically, because electronic systems, 1 (208), 2 (210) and N (212) are able to retrieve device information from images 1 (406), 2 (408) and N (410) through links 434, 436 and 438, the electronic systems treat these images as USB devices. Additionally, during a bus enumeration process, these electronic systems also send unique addresses and assign configuration values to these images. Device-side control block 414 is responsible for making certain that such information is properly updated in images 1 (406), 2 (408) and N (410) through links 426, 428 and 430.

After the images 1 (406), 2 (408) and N (410) of USB device 216 have the appropriate configuration information, they are ready to respond to commands from electronic systems 1 (208), 2 (210) and N (212). Because USB is a polled bus, the electronic systems as USB hosts initiate data transfers. As an illustration, USB device 216 is a one-way USB device, such as a mouse, a keyboard or a joystick. The data transfer mode applicable for such a device is called "interrupt transfer", where the host polls the actual interrupts caused by the device.

Figure 5:
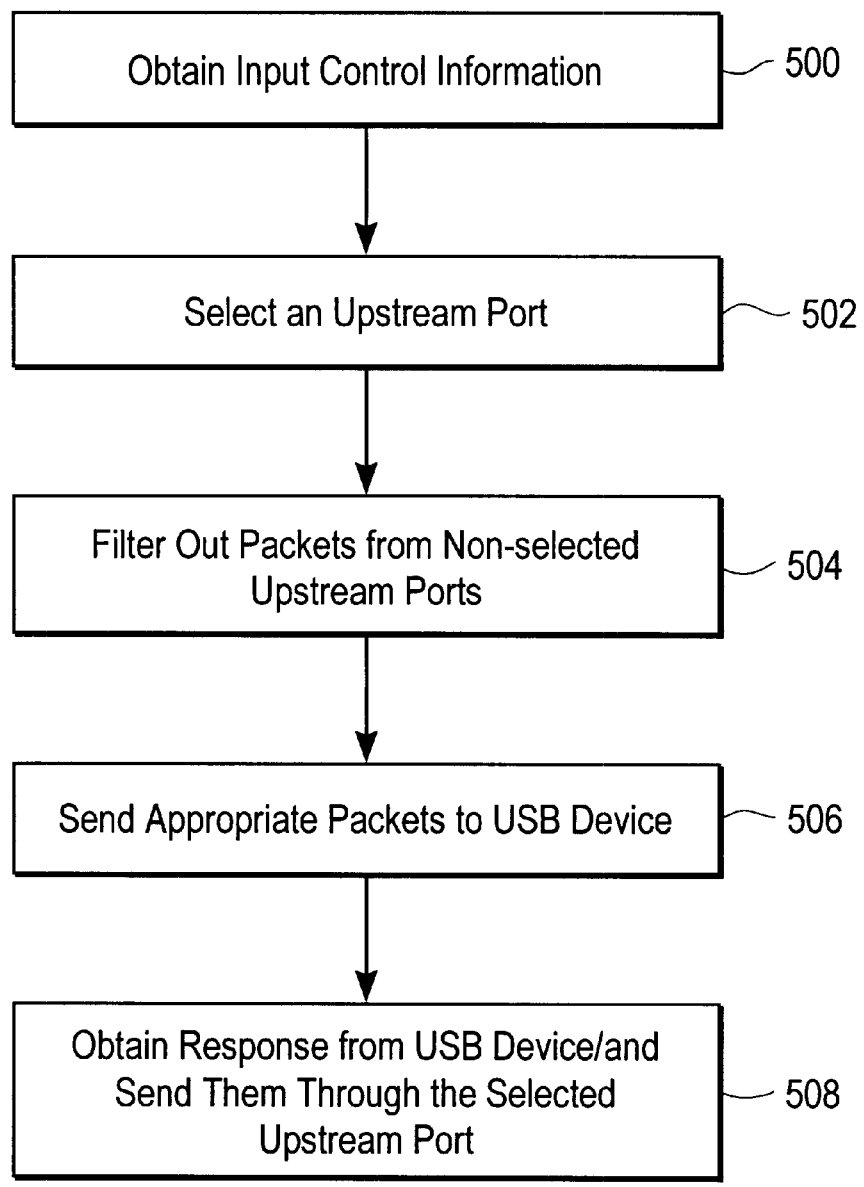
FIG. 5 illustrates a flow chart of one process for performing data transfer between a selected upstream port and a USB device.

FIG. 5 illustrates a flow chart of one embodiment of a process for performing data transfer between a selected upstream port and USB device 216. In one embodiment, either host-side control block 412 or device-side control block 414 receives the previously mentioned input control information, such as a unique sequence of keystrokes in block 500. Based on the input control information, the control blocks 412 and 414 establish a corresponding upstream port in block 502. With an upstream port selected, device-side control block 414 filters out incoming packets from other upstream ports in block 504. Device-side control block 414 may either ignore those packets or store them temporarily and process them when the originator of the packets matches the selected upstream port.

In block 504, the control blocks 412 and 414 send data packets from the electronic system attached to the selected upstream port to USB device 216. In an interrupt transfer mode, the data packets from the electronic system poll USB device 216 for interrupt information. If a new interrupt is pending, USB device 216 returns the information in a data packet. Control blocks 412 and 414 then route the data packet to the electronic system, which is attached to the previously selected upstream port in block 505.

When USB device 216 is detached from switcher 200, bus interface 400 frees up any previously committed resources and notifies host-side control block 412. Host-side control block 412 informs device-side control block 414, which then proceeds to power off bus interfaces 416, 418 and 420 through control links 440, 442 and 444. Additionally, host-side control block 412 may clear the stored images in memory subsystem 404, or it may simply overwrite the stored images with new images when USB device 216 is reattached.

It should be reiterated that host-side control block 412 and device-control block 414 can be combined into one single control block. It should be apparent to one ordinarily skilled in the art to implement the described functionality of the two control blocks in a variety of system architectures without exceeding the scope of the disclosed switcher. Similarly, although one embodiment of switcher 200 utilizes separate device-side USB bus interfaces 416, 418 and 420, one ordinarily skilled in the art can design a switcher with one common device-side USB bus interface to serve the multiple upstream ports and still remain within the scope of the disclosed switcher.

Figure 6:
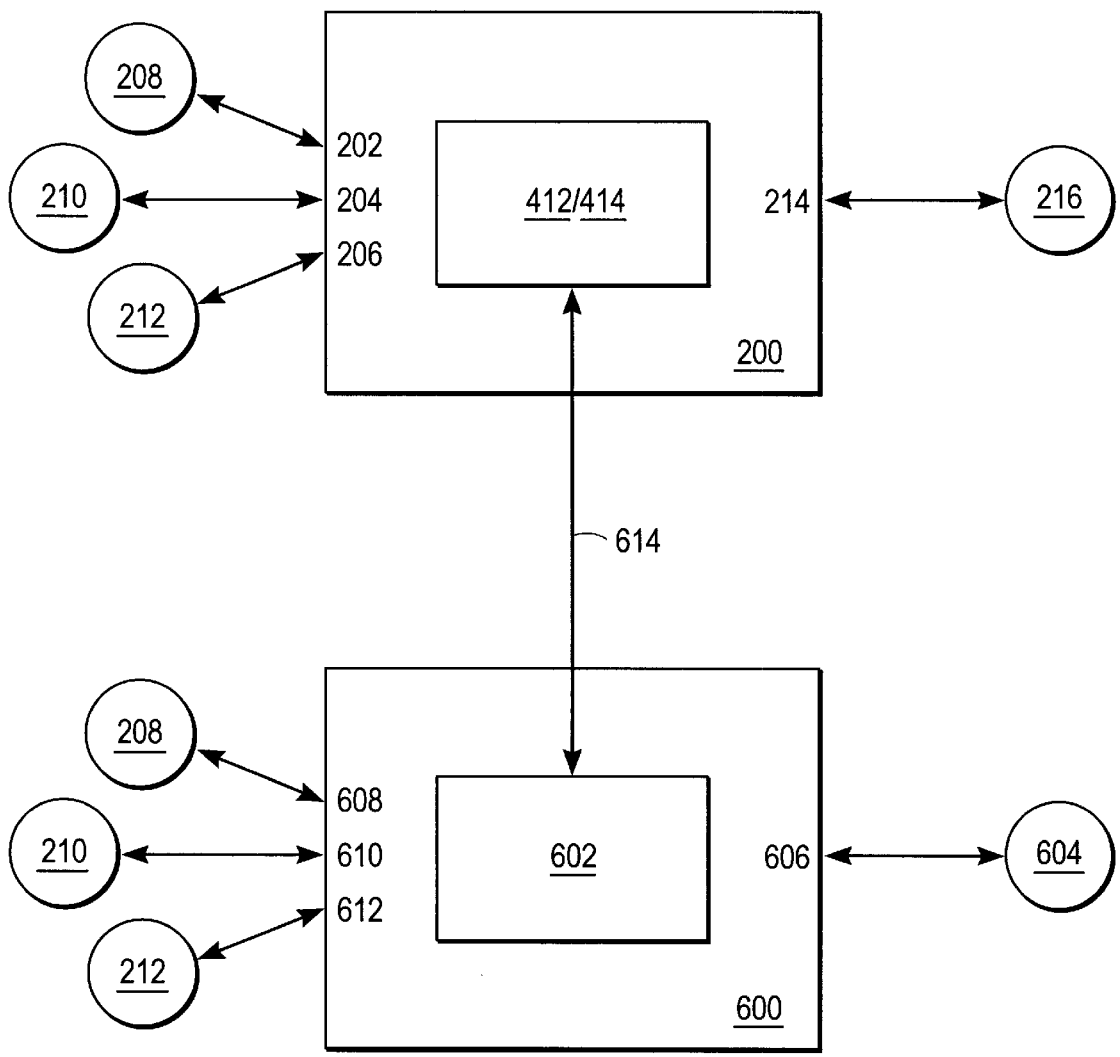
FIG. 6 illustrates one configuration with two switchers connected to each other.

FIG. 6 illustrates another embodiment of switcher 200, where its control block is connected to another switcher's control block. Specifically, the control block, containing both host-side control block 412 and device-side control block 414, of switcher 200 is connected to control block 602 of switcher 600. Similar to switcher 200, switcher 600 has a downstream port 606, which connects to USB device 604. Switcher 600 also has upstream ports 608, 610 and 612, which connect to the same electronic systems switcher 200 connects to. They are electronic system 1 (208), 2 (210) and N (212).

The connection between the two control blocks allows the two switchers to switch multiple USB devices to a connected electronic system. For example, when switcher 200 decides to switch to upstream port 204, where electronic system 2 (210) is connected to, its control blocks 412 and 414 inform control block 602 of switcher 600 of this state change through link 614. After one embodiment of control blocks 412, 414 and 602 execute the steps previously described in FIG. 5, both USB device 216 and USB device 604 communicate with the newly switched electronic system 2 (210). Although FIG. 6 shows two separate switchers, it should be apparent to one with ordinary skill in the art to combine the aforementioned functionality into one switcher and still remain within the scope of the disclosed switcher.

Thus, a method and apparatus for allowing multiple electronic systems to share a USB device has been disclosed. Although the disclosure has particular references to the figures, the disclosure may appear in any number of systems. It is further contemplated that many changes and modifications may be made by one of ordinary skill in the art without departing from the spirit and scope of the invention.

What is claimed is:

1. A method for a plurality of electronic systems to share a Universal Serial Bus (USB) device, comprising:
   a. connecting the electronic systems and the USB device to a switcher;
   b. the switcher performing bus enumeration to acquire USB device information;
   c. presenting a plurality of images of the acquired USB device information to the electronic systems;
   d. maintaining logical links between the electronic systems and the USB device; and
   e. selecting one of the electronic systems to communicate USB data packets with the USB device.

2. The method according to claim 1, wherein the USB device refers to a one-way USB device.

3. The method according to claim 1, wherein the switcher comprises a predetermined number of upstream ports for the electronic systems to connect to.

4. The method according to claim 1, wherein the images in 1(c) are stored in a memory subsystem of the switcher.

5. The method according to claim 3, wherein the number of the images in 1(c) equals to the predetermined number of the upstream ports.

6. The method according to claim 1, wherein 1(c) further comprises invoking the connected electronic systems to initiate bus enumeration with the images.

7. The method according to claim 1, wherein 1(d) further comprises maintaining appropriate voltage levels between the connected electronic systems and the switcher.

8. The method according to claim 1, wherein 1(e) further comprises:
   a. receiving control information from the USB device; and
   b. selecting one of the upstream ports according to the received control information.

9. The method according to claim 1, wherein 1(e) further comprises:
   a. receiving control information from an external input source; and
   b. selecting one of the upstream ports according to the received control information.

10. The method according to claim 1, wherein the switcher in 1(a) further connects to a second switcher, wherein the second switcher connects to the same electronic systems as in claim 1 and to a second USB device.

11. The method according to claim 10, wherein the selected electronic system in 1(e) communicates the USB data packets with both the USB device as in claim 1 and the second USB device.

12. A switcher for allowing a plurality of electronic systems to share a Universal Serial Bus (USB) device, comprising:
   a. a plurality of upstream ports to connect to the electronic systems and a device port to connect to the USB device;
   b. a USB host controller to perform bus enumeration to acquire USB device information through a device-side USB bus interface;

c. a memory subsystem, coupled to the USB host controller, to store a plurality of images of the acquired USB device information;

d. a plurality of host-side USB bus interfaces, coupled to a control block, to present the images to the connected electronic systems and to maintain logical links between the connected electronic systems and the USB device; and e. the control block, coupled to the memory subsystem, the device-side USB bus interface and the host-side USB bus interfaces, to select one of the connected electronic systems to communicate USB data packets with the USB device.

13. The switcher according to claim 12, wherein the USB device refers to a one-way USB device.

14. The switcher according to claim 12, wherein the memory subsystem in 12(c) stores an equal number of the images as the number of the upstream ports.

15. The switcher according to claim 12, wherein the host-side USB bus interface in 12(d) further:

a. invokes the connected electronic systems to initiate bus enumeration with the images; and b. maintains appropriate voltage levels between the connected electronic systems and the switcher.

16. The switcher according to claim 12, wherein the control block in 12(e) further:

a. receives control information from the USB device; and b. selects one of the upstream ports according to the received control information.

17. The switcher according to claim 12, wherein the control block in 12(e) further:

a. receives control information from an external input source; and b. selects one of the upstream ports according to the received control information.

18. The switcher according to claim 12, wherein the switcher further connects to a second switcher and the second switcher connects to the same electronic systems as in claim 11 and to a second USB device.

19. The switcher according to claim 18, wherein the selected electronic system in 12(e) communicates the USB data packets with both the USB device as in claim 11 and the second USB device.

20. A switcher for a plurality of electronic systems to share a Universal Serial Bus (USB) device, comprising:

a. means for connecting the electronic systems and the USB device;

b. means for performing bus enumeration by the switcher to acquire USB device information;

c. means for presenting a plurality of images of the acquired USB device information to the connected electronic systems;

d. means for maintaining logical links between the connected electronic systems and the USB device; and e. means for selecting one of the connected electronic systems to communicate USB data packets with the USB device.

21. The switcher according to claim 20, wherein the USB device refers to a one-way USB device.

22. The switcher according to claim 20, wherein the switcher comprises a predetermined number of upstream ports for the electronic systems to connect to.

23. The switcher according to claim 22, wherein the number of images in 20(c) equals to the predetermined number of the upstream ports.

24. The switcher according to claim 20, wherein 20(c) further comprises invoking the connected electronic systems to initiate bus enumeration with the images.

25. The switcher according to claim 20, wherein 20(d) further comprises maintaining appropriate voltage levels between the connected electronic systems and the switcher.

26. The switcher according to claim 20, wherein 20(e) further comprises:

a. receiving control information from the USB device; and b. selecting one of the upstream ports according to the received control information.

27. The switcher according to claim 20, wherein 20(e) further comprises:

a. receiving control information from an external input source; and b. selecting one of the upstream ports according to the received control information.

28. The switcher according to claim 20, wherein the switcher further connects to a second switcher, wherein the second switcher connects to the same electronic systems as in claim 20 and to a second USB device.

29. The switcher according to claim 28, wherein the selected electronic system in 20(e) communicates the USB data packets with both the USB device as in claim 20 and the second USB device.

* * * * *

UNITED STATES PATENT AND TRADEMARK OFFICE
CERTIFICATE OF CORRECTION

PATENT NO. : 6,546,450 B1
DATED : April 8, 2003
INVENTOR(S) : Liu

It is certified that error appears in the above-identified patent and that said Letters Patent is hereby corrected as shown below:

Column 3,
Line 16, after "standard", insert -- I/O --.

Signed and Sealed this

Sixteenth Day of September, 2003

JAMES E. ROGAN
*Director of the United States Patent and Trademark Office*